Patented Nov. 1, 1927.

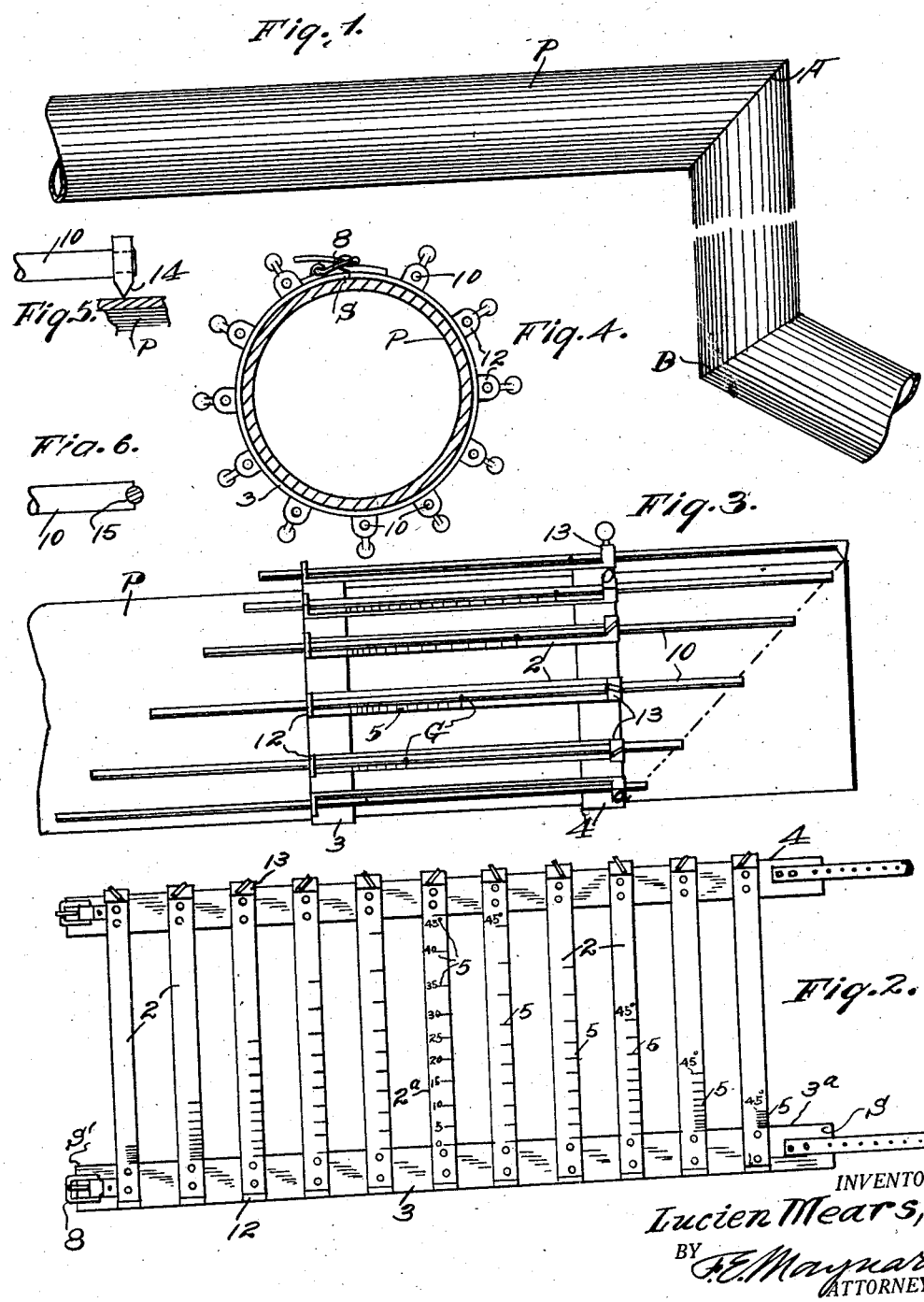

1,647,707

UNITED STATES PATENT OFFICE.

LUCIEN MEARS, OF McKITTRICK, CALIFORNIA.

UNIVERSAL ANGLE PATTERN.

Application filed March 23, 1927. Serial No. 177,675.

This invention relates to measuring instruments and more especially to a pattern for marking lines indicative of a plane of cut on or of juncture of cylindrical bodies.

An object of the invention is to provide a device whereby a rectilinear development may be easily produced on a plane surface to correspond with a line of cut, or intersection, of cylindrical bodies, at any angle from zero to ninety degrees, and to provide a pattern having degree index scales which are so connected that they be wrapped, as a series, in parallel position about and lie longitudinally on a cylinder to be marked without relative shift of the index scales.

A further object is to provide a flexible angle marking pattern having non-shifting degree scales coordinated with slidable scribers or pointers which are adjustable as to the scales to indicate points, on a given cylinder, falling in a plane transverse of given angle to the axis thereof.

An object is to provide a protractor or angle pattern of very simple construction, of practicable design and very low cost, considering the nature of the function and capacity of the invention.

Additional objects, advantages and features will be made manifest in the ensuing specification of the herewith illustrated embodiments; it being understood that modifications, variations and adaptations may be conceived and incorporated within the scope, spirit and principle of the invention as it is more drectly hereinafter claimed.

Figure 1 is a plan of an angularly deflected pipe line, indicating angle planes joined after properly cut.

Figure 2 is a plan of the extended pattern as for use in marking on a plane surface.

Figure 3 is a side view showing the marker with rod as employed for marking an angle on a cylinder.

Figure 4 is a rear end view of the marker of Fig. 3.

Figure 5 shows a scribing point on a rod.

Figure 6 shows a marking rod having a pencil or chalk seat in its end.

It often happens, in oil and gas fields, that heavy and large size pipe must be cut obliquely to its axis so that angular deflections may be formed. In a 90° bend the plane of juncture is 45° to the axis, as at A, Fig. 1, in pipe P. When the deflection is 60° the plane of juncture is 30° as at B. The common method, in the field, is to mark the line of cut and then effect the cut by a gas flame.

My invention consists of a simple tool by which a common laborer, or unskilled help, may accurately and quickly mark the pipe on any desired angle for cutting to enable juncture of the pipe ends at a given angle to each other.

The instrument is made in various sizes, for respective outside diameters of pipe of different sizes. The preferred tool includes a series of spaced scale strips 2 set in fixed position on a flexible base line strap or split band 3 of any suitable type and material.

The strips 2 are parallel and are shown as connected at their outer ends to a strap or band 4, though this is not wholly essential.

One strip, $2^a$, is provided with a scale of graduation marks 5, along one edge, representing degrees from the base (zero) line up to 45°; the length of the degree scale on this strip $2^a$ being just equal to the outside diameter of the pipe to be cut. The base line is here shown as the inner edge $3^a$ of the strap 3 and this has a starting point or mark S on one end. A suitable number of scale strips are equally spaced between strip $2^a$ and the terminals of strap 3. Each strip 2 has a scale 5 of degree marks whose positions or spacings are determined by the relative position of the respective strip as an ordinal of a development curve from a cylinder of given diameter. The degree graduations read from zero to 45° on each scale; the scale strip $2^a$ having the longest scale and the others to right and left, being shorter, as clearly shown in Fig. 2.

To develop the line necessary to cut any plane up to 45° across the axis of the pipe it is only necessary to spread the device on a flat sheet, or plane, and, by a scribing point, mark off at the point S and then, on the determined degree line of cut, at each scale strip 2. The marks so made are connected by a line running from zero, S, up to the highest ordinal mark of the given degree and then down on the other side to the opposite end S' of the base line. From the line so produced a pattern can be cut and this may be wrapped around the given cylinder to show thereon a plane of cut at the desired or given angle.

Instead of producing a rectilinear projection as just described, the device may be laid around the cylinder P to be cut and the strap ends S—S' may be butted and secured, as by a buckle 8; likewise the outer strap 4. When so secured, a marker is applied at a given angle graduation on each strip around the pipe and at the zero point S. Then the marks made are connected, after removal of the gaging instrument, by a line obliquely around the cylinder. This indicates the plane of cut to be made.

There may be, as here shown, an adjustable marking rod or pointer 10 mounted on each degree scale 2, these having end bearing 12—13 in which the rods are slidable to desired degree position as indicated by the guide mark G on each rod. The outer ends of the rods 10 may have a scribing point 14 or may have a chalk seat 15.

In the use of the device with the rods 10, the straps 3—4 are closed around the cylinder and the rods are individually adjusted each with its guide mark G set to similar degree graduations along the scale according to the given angle of cut to be made. Marks are then made on the cylinder at the ends of pointers 10 and the pattern device removed. Then the score marks are connected by a line around the cylinder. This accurately shows the plane of cut.

What is claimed is:

1. An instrument for delineating angular planes across a given size cylinder, comprising a flexible base-line strap having a fixed set of spaced parallel ruler-like scale strips which are relatively differentially graduated to indicate degrees from zero to forty-five degrees; the longest scale being equal to the diameter of the given cylinder, said scale constituting ordinals of a curved line developed from the master cylinder, said strips presenting free and uninterrupted scribing edges between the extremes of the degree graduations.

2. An instrument for delineating angular planes across a given size cylinder, comprising a flexible base-line strap having a fixed set of spaced parallel scale strips which are relatively differentially graduated to indicate degrees from zero to forty-five degrees; the longest scale being equal to the diameter of the given cylinder, said scale constituting ordinals of a curved line developed from the master cylinder and said strips presenting continuous, side, scribing edges at which marks may be registered at any degree within the prescribed angle scale; the outer ends of the strips remote from the base line strap being connected by a flexible outer strap, said base line and outer straps being spaced a distance equal to the diameter of the prescribed cylinder.

3. An instrument for delineating angular planes across a given size cylinder, comprising a flexible base-line strap having a fixed set of spaced parallel scale strips which are relatively differentially graduated to indicate degrees from zero to forty-five degrees; the longest scale being equal to the diameter of the given cylinder, said scale constituting ordinals of a curved line developed from the master cylinder, and pointed rods mounted on respective scale strips and having guide marks to be selectively registered with any desired scale marks; whereby the pointed rod ends will indicate a desired angular plane across the cylinder.

4. A protractor comprising a set of parallel, uniformly spaced, ruler-like strips presenting uninterrupted, straight scales differentially graduated with degree calibrations, and flexible means connecting the strips for positioning around a cylinder and holding them parallel throughout their length.

LUCIEN MEARS.